Jan. 10, 1967    D. LIEPELT    3,296,958
HEATED TYPE PLATE

Filed May 7, 1965    2 Sheets-Sheet 1

INVENTOR.
DIRK LIEPELT
BY Robert W. Beach
ATTORNEY

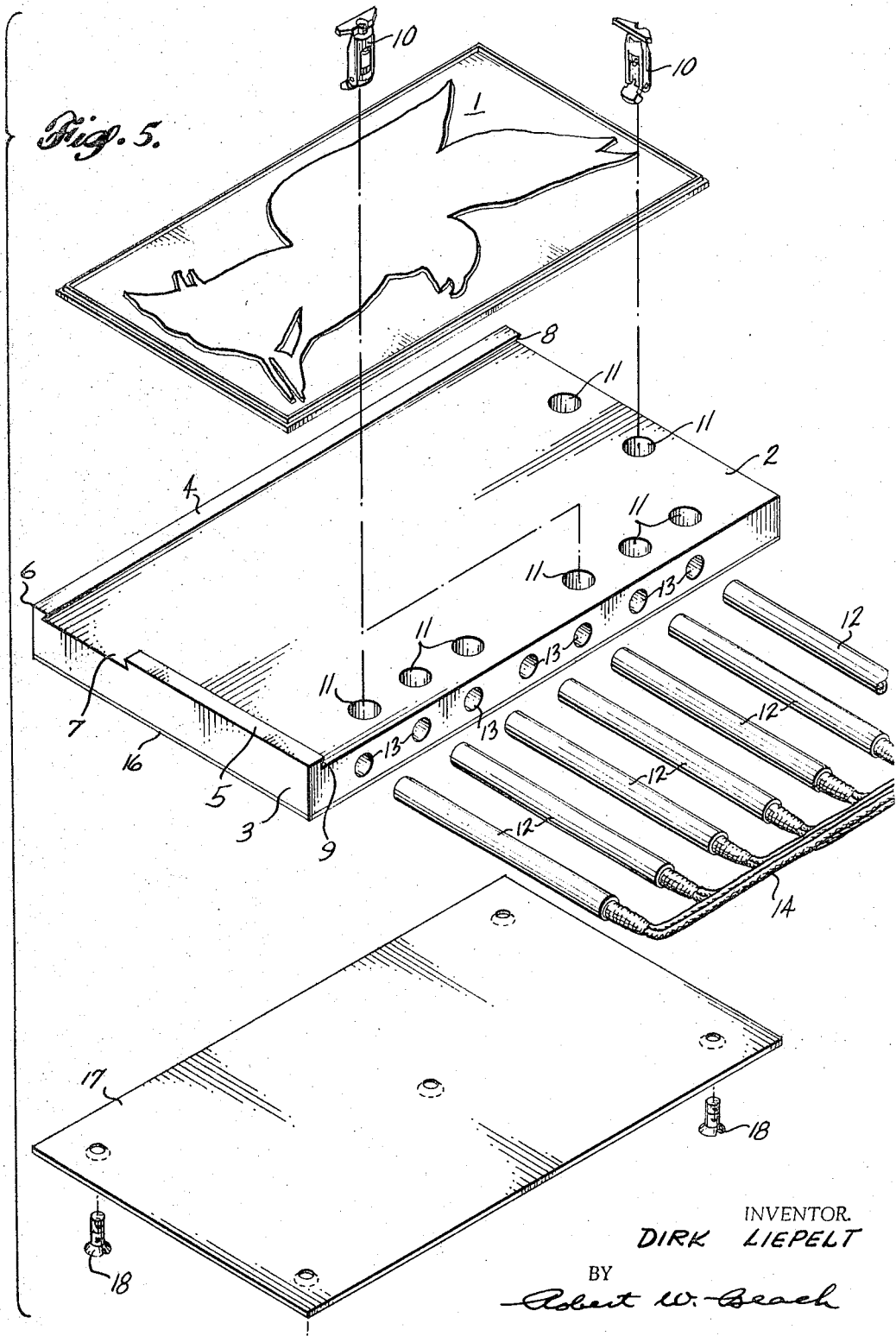

United States Patent Office 3,296,958
Patented Jan. 10, 1967

3,296,958
HEATED TYPE PLATE
Dirk Liepelt, 13741 Bothell Way NE.,
Seattle, Wash. 98125
Filed May 7, 1965, Ser. No. 453,907
3 Claims. (Cl. 101—31)

This invention relates to a backing plate for large cuts used in embossing which are required to be heated.

A principal object of the present invention is to provide a backing plate or block for large cuts which has a mounting surface that can be disposed in heat-conducting relationship to a large cut for the purpose of heating such a cut effectively and uniformly.

An additional object is to provide such a backing plate on which a large cut can be secured quickly and accurately to locate it properly in a printing press and to prevent it from becoming loose during the printing operation.

It is a further object to enable such a cut to be mounted on the backing plate quickly and easily as well as securely without danger of injuring the cut which may be of considerable value. More specifically, it is an object to secure such a cut along a substantial portion of its edges to hold the cut securely without buckling.

It is also an object to provide such a backing which can be heated with minimum loss of heat and from which the heat will be conducted quickly to a cut mounted on the plate.

A further object is to provide a heated backing plate for cuts which can be altered readily to accommodate cuts of different thickness while the composite backing and cut assembly will be precisely type high.

These objects can be accomplished by providing a backing plate having a cut-mounting face of an area as least as great as the area of the largest cut to be accommodated on the backing plate. Such backing plate is provided with cut-retaining flanges along adjacent edges of the mounting surface, the inner sides of which flanges have under bevels to receive the corresponding edges of a cut. Rows of anchor holes are provided in the edge portions of the backing plate opposite such flanges for receiving cut-clamping elements. Between such anchor holes, bores extend into the body of the backing plate parallel to the mounting surface for receiving sealed heating elements. Wires connected to such heating elements are embedded in a strip of insulating material extending along one margin of the backing plate. The face of the backing plate opposite the cut-mounting face is covered with a layer of insulating material to confine the heat to the plate body. A shim may be affixed to the outer side of the insulating layer of such thickness as may be required to make the assembly of shim, backing plate and cut type high.

FIGURE 5 is a top perspective of the plate showing the components in exploded relationship.

Figure 1:
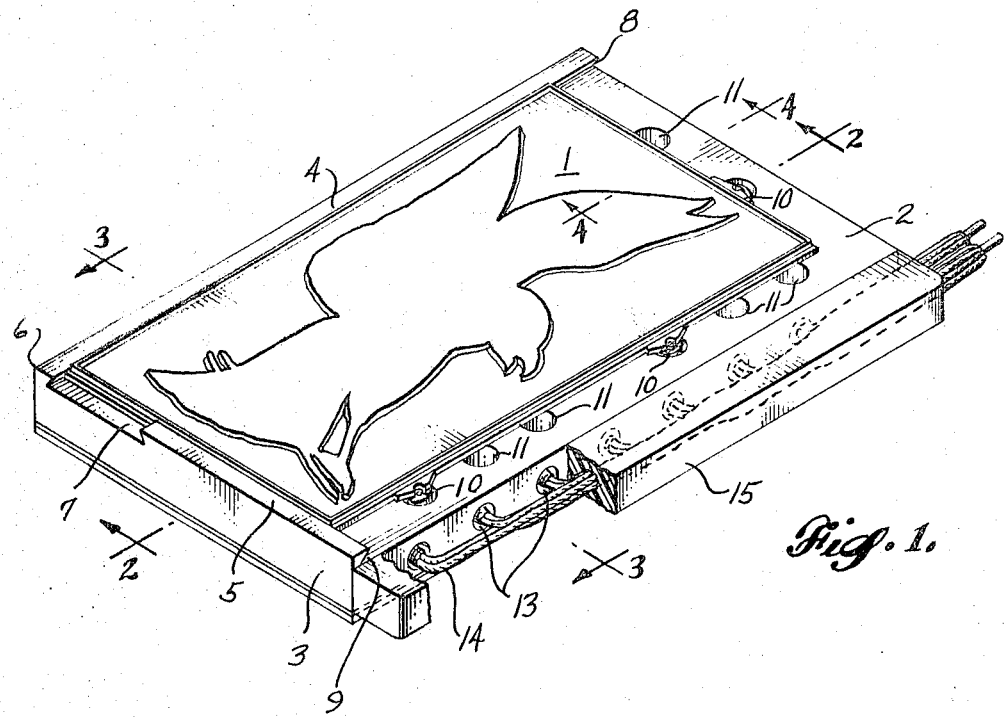
FIGURE 1 is a top perspective of the backing plate with a cut mounted on it and having parts broken away.

FIGURE 1 discloses the manner in which a representative large cut 1 is placed on the cut-mounting face 2 of the heated printing backing plate 3. The cut is simply a metal plate on which the particular design to be embossed has been engraved in relief. The backing plate is shown as being of rectangular shape and along two adjacent edges of the cut-mounting surface are flanges 4 and 5. The flange 4 extends along the longer edge of the plate 3 and the flange 5 extends along the shorter edge of the two adjacent edges. Also the flange 5 stops short of the corner 6 to leave a gap 7.

The inner side 8 of the flange 4 and the inner side 9 of the flange 5 are formed as under-bevel surfaces into which the corresponding stepped edges of the cut 1 can fit. Such edges of the cut would, therefore, be held firmly and prevented from buckling by their engagement with the under-bevel sides of the flanges. The gap 7 in the flange 5 is produced in the formation of the flanges 4 and 5 by milling the under-bevel side of the flange 4. A circular rotary milling cutter is used to cut the under bevel and in order to cut such under bevel 8 completely to the corner 6 it is necessary to run the mill diameter into registry with the edge of the plate on which the flange 5 is formed. In such operation a gap 7 is necessarily cut of a width equal to the diameter of the milling cutter.

Figure 2:
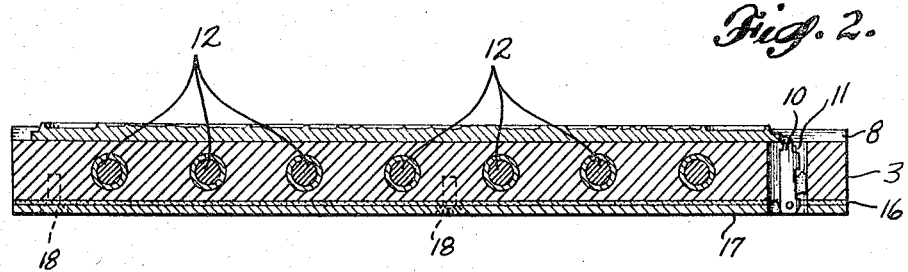
FIGURE 2 is a longitudinal section through the backing plate taken on line 2—2 of FIGURE 1
Figure 3:
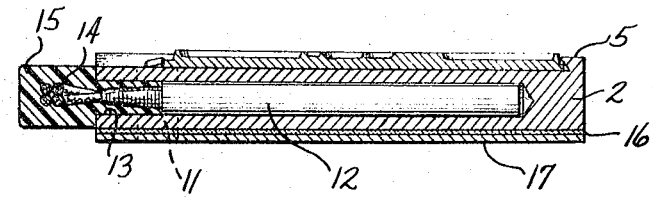
FIGURE 3 is a transverse section through the plate taken on line 3—3 of FIGURE 1.
Figure 4:
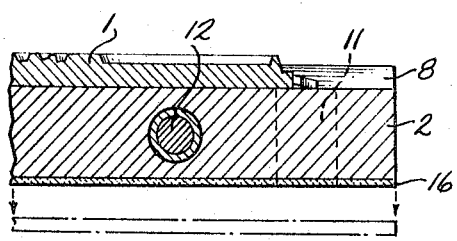
FIGURE 4 is an enlarged fragmentary sertion taken on line 4—4 of FIGURE 1.

In order to hold the cut 1 with its corresopnding edges in wedging engagement with the flanges 4 and 5, retaining means in the form of clamping elements engage the opposite edges of the cut. Such clamping elements 10 of conventional construction are inserted in two or more anchor holes 11 penetrating the mounting surface 2 of the plate 3. Preferably such holes extend completely through the backing plate 3, as shown best in FIGURE 2. It is preferred to provide several anchor holes 11 adjacent to the edge of plate 3 opposite flange 4 and at least one of such holes adjacent to the edge of such plate opposite flange 5.

It is important that the entire area of the cut 1 be heated substantially uniformly. Such heating action cannot be accomplished effectively by placing an unheated metal type plate carrying the cut between heated blocks so that heat will be conducted only edgewise into the printing plate. In the present construction a plurality of heating elements 12, preferably of the sealed electrical resistance type, are inserted into bores 13 in the body of the plate which extend in parallel relationship generally parallel to the mounting surface 2 of the plate. In order to promote uniform heating of the backing plate, these bores should be reasonably close together and they should be spaced equally from each other, as shown best in FIGURES 1 and 2.

It will be noted that the spacing of the bores 13 receiving the heating elements is substantially the same as the spacing between the anchor holes 11 so that such bores and anchor holes can be arranged in staggered relationship, as shown best in FIGURE 5. The wires 14 connected to the several heating elements 12 can be grouped together to form a harness extending parallel to the edge of the backing plate 3, at which the bores 13 for receiving the heating elements open. The wire group is shown in FIGURE 1 as being embedded in a solid strip of insulating material which is also heat resistant so that it will not be melted or deformed by heat generated by the heating elements 12. A suitable material for this purpose is an epoxy resin.

Both to conserve heat and to prevent objectionable overheating of parts of the printing press, it is desirable to provide a layer 16 of heat-insulating material covering the face of the backing plate 3 opposite the mounting surface 2. Such insulating layer should be of hard material such as asbestos board so as to withstand the printing pressure to which the cut is subjected. If the thickness of the backing plate 3 and the thickness of the cut 1 is such that the aggregate thickness is type high, the insulating layer 16 may engage the cut-mounting surface of the plate directly. Cuts 1 of different thicknesses can be used, however, in which case it is necessary to compensate for the difference in thickness of the cut either by utilizing backing plates 3 of correspondingly different thicknesses or by providing a shim plate 17 which can be secured to the outer side of the insulating layer 16 by flathead screws 18 shown in FIGURE 5.

In use the backing plate 3 with the cut 1 mounted on its cut-mounting surface 2 can be clamped in a printing press by furniture and quoins in the usual manner. Wires 14 can be connected to a suitable source of electric current and it is preferred that such current be regulated by a thermostat responsive to the temperature of the plate 3 so that the cuts will be maintained at the optimum temperature. It is preferred that the plate 3 be made of metal having good heat-conducting characteristics, such as aluminum, so that the heat will be conducted uniformly throughout its area and transmitted substantially equally to all parts of the metal cut 1.

I claim as my invention:

1. A heated type plate for mounting a plate cut, comprising backing plate means having a generally rectangular cut-mounting face, a flange projecting above said cut-mounting face along one edge thereof, said backing plate means having therein a set of anchor holes extending into it from said cut-mounting face for receiving clamping means engageable with edge portions of a cut on said cut-mounting face, such holes being spaced lengthwise of said flange and spaced therefrom, said backing plate means having a plurality of elongated substantially parallel bores located substantially parallel to and beneath said cut-mounting face with their lengths extending transversely of said flange and disposed in spaced relationship staggered with respect to such anchor holes, and a heating element received in each of such bores in said backing plate means.

2. A heated type plate for mounting a plate cut, comprising backing plate means having a generally rectangular cut-mounting face, under-cut flanges projecting above said cut-mounting face along adjacent edges thereof, respectively, and thereby disposed in an angular relationship to each other, said backing plate means having therein two sets of anchor holes extending into it from said cut-mounting face for receiving clamping means engageable with edge portions of a cut on such cut-mounting face, the holes of each set being spaced lengthwise of one of said flanges, respectively, and located adjacent to the edge of said backing plate means opposite such flange, said backing plate means having a plurality of elongated substantially parallel bores located substantially parallel to and beneath said cut-mounting face with their lengths extending transversely of one of said flanges and disposed in spaced relationship staggered with respect to the anchor holes of the set spaced lengthwise of such flange, a heating element received in each of such bores in said backing plate means, and a thin insulating layer of unyielding material on the side of said backing plate means opposite said cut-mounting face and forming a flat, unobstructed bearing surface for mounting and positioning the type plate.

3. A heated type plate for mounting a plate cut, comprising backing plate means having a cut-mounting face, said backing plate means having therein a row of spaced anchor holes extending into it from said cut-mounting face for receiving clamping means engageable with edge portions of a cut on said cut-mounting face, said backing plate means having a plurality of elongated substantially parallel bores located substantially parallel to and beneath said cut-mounting face with their lengths extending transversely of said row of anchor holes and disposed in spaced relationship staggered with respect to such anchor holes, and a heating element received in each of such bores in said backing plate means.

References Cited by the Examiner

UNITED STATES PATENTS

| 463,991 | 11/1891 | Jackson et al. | 101—31 |
| 477,627 | 6/1892 | Carpenter | 101—31 |
| 764,517 | 7/1904 | Berry | 101—383 |
| 994,686 | 6/1911 | Mitchell | 101—27 |
| 1,484,455 | 2/1924 | Abbott | 101—27 |
| 1,486,324 | 3/1924 | Eaton | 101—383 |
| 1,554,123 | 9/1925 | Noell | 101—385 |
| 1,990,958 | 2/1935 | Roberts | 101—31 |
| 2,032,767 | 3/1936 | Rosten | 101—31 |
| 2,558,354 | 6/1951 | Gottscho | 101—31 X |

ROBERT E. PULFREY, *Primary Examiner.*

W. F. McCARTHY, *Assistant Examiner.*